(12) United States Patent
Inglis et al.

(10) Patent No.: US 9,694,432 B2
(45) Date of Patent: Jul. 4, 2017

(54) DRILL REAMER

(71) Applicant: Exactaform Cutting Tools Limited, Coventry (GB)

(72) Inventors: John Inglis, Coventry (GB); Peter Raynor, Coventry (GB)

(73) Assignee: Exactaform Cutting Tools Limited, Coventry (GB)

( * ) Notice: Subject to any disclaimer, the term of this patent is extended or adjusted under 35 U.S.C. 154(b) by 563 days.

(21) Appl. No.: 14/345,700

(22) PCT Filed: Sep. 19, 2012

(86) PCT No.: PCT/GB2012/052308
§ 371 (c)(1),
(2) Date: Mar. 19, 2014

(87) PCT Pub. No.: WO2013/041855
PCT Pub. Date: Mar. 28, 2013

(65) Prior Publication Data
US 2014/0227034 A1    Aug. 14, 2014

(30) Foreign Application Priority Data
Sep. 19, 2011    (GB) .................................... 1116115.5

(51) Int. Cl.
*B23D 77/02* (2006.01)
*B23B 51/08* (2006.01)

(52) U.S. Cl.
CPC .............. *B23D 77/02* (2013.01); *B23B 51/08* (2013.01); *B23B 2222/92* (2013.01);
(Continued)

(58) Field of Classification Search
CPC .. B23D 77/02; B23D 77/12; B23D 2277/061; B23D 2277/2442; B23D 2277/245; B23D 2277/60; B23B 51/08; B23B 2251/505
See application file for complete search history.

(56) References Cited

U.S. PATENT DOCUMENTS 1,887,373 A * 11/1932 Emmons ................. B23B 51/02
175/426
4,091,525 A * 5/1978 Karasiewicz .......... B23D 77/02
29/90.01
(Continued)

FOREIGN PATENT DOCUMENTS

CN     201442132 U    4/2010
CN     201529812 U    7/2010
(Continued)

*Primary Examiner* — Eric A Gates
(74) *Attorney, Agent, or Firm* — Suiter Swantz pc llo

(57) ABSTRACT

A drill reamer (20) comprises an elongate body (21) disposed about a longitudinal axis. The elongate body comprises flutes (22a-22d) having separate hard cutting sections (27a, 28'a, 28"a, 28'b, 28"b) and a soft cutting section (24a, 24b). The soft cutting section is formed of a material such as carbide having a hardness that is less than that of the hard cutting sections, which may be formed of polycrystalline diamond. At least one first hard cutting section (27a) is axially displaced relative to at least one second hard cutting section (28'a, 28"a). The reamer has a tip cutting edge (23a, 23c) and tapered cutting edge portions (24a-24d) disposed at an acute angle relative to the longitudinal axis.

11 Claims, 4 Drawing Sheets

(52) U.S. Cl.
CPC ..... *B23B 2226/275* (2013.01); *B23B 2226/31* (2013.01); *B23B 2251/04* (2013.01); *B23B 2251/14* (2013.01); *B23B 2251/18* (2013.01); *B23B 2251/505* (2013.01); *B23D 2277/061* (2013.01); *B23D 2277/245* (2013.01); *B23D 2277/2442* (2013.01); *B23D 2277/2464* (2013.01); *B23D 2277/60* (2013.01)

(56) References Cited

U.S. PATENT DOCUMENTS

| | | | |
|---|---|---|---|
| 5,217,332 A | | 6/1993 | Takasaki et al. |
| 5,238,335 A | * | 8/1993 | Nomura ................. B23D 77/02 408/199 |
| 5,297,456 A | | 3/1994 | Nishimura |
| 5,312,208 A | | 5/1994 | Shiga et al. |
| 5,354,155 A | * | 10/1994 | Adams ..................... B23B 51/00 408/145 |
| 5,649,794 A | * | 7/1997 | Kress ....................... B23B 51/00 408/181 |
| 6,206,617 B1 | * | 3/2001 | Kawazoe ................ B23D 77/02 408/1 R |
| 6,290,438 B1 | * | 9/2001 | Papajewski ............ B23D 77/02 408/145 |
| 9,056,360 B2 | * | 6/2015 | Ast ......................... B23D 77/02 |
| 9,079,260 B2 | * | 7/2015 | Xiao ....................... B23D 77/02 |
| 9,144,853 B2 | * | 9/2015 | Bitzer .................... B23D 77/02 |
| 2008/0152445 A1 | * | 6/2008 | Jensen ................... B23D 77/006 408/145 |
| 2008/0193234 A1 | | 8/2008 | Davancens et al. |
| 2013/0156520 A1 | * | 6/2013 | Hacker ................... B23D 77/02 408/113 |
| 2013/0216318 A1 | * | 8/2013 | Bozkurt .................. B23B 31/005 407/11 |

FOREIGN PATENT DOCUMENTS

| | | | |
|---|---|---|---|
| CN | 201889548 U | 7/2011 | |
| CN | 102145394 A | 8/2011 | |
| DE | 3602427 A1 * | 7/1987 | ........... B23B 51/009 |
| DE | 102005034422 A1 * | 1/2007 | ........... B23D 77/006 |
| EP | 0365218 A1 | 12/1989 | |
| FR | 2654663 A1 * | 5/1991 | ............. B23B 51/02 |
| GB | 753836 A * | 8/1956 | ........... B23D 77/006 |
| GB | 937767 A * | 9/1963 | ............. B23B 51/08 |
| GB | 2259263 A | 10/1993 | |
| GB | 2436723 A | 10/2007 | |
| GB | 2480011 A | 2/2011 | |
| JP | 09234615 A | 9/1997 | |
| JP | 10113819 A2 | 5/1998 | |
| JP | 2004017238 A | 1/2004 | |
| JP | 2010094766 A2 | 4/2010 | |
| WO | 9743068 A1 | 11/1997 | |
| WO | 0044518 A1 | 8/2000 | |
| WO | 2008013725 A2 | 1/2008 | |
| WO | 2008133295 A1 | 11/2008 | |
| WO | 2011049095 A1 | 4/2011 | |

\* cited by examiner

DRILL REAMER

This invention relates to a drill reamer and in particular but not exclusively to drill reamers for drilling non-ferrous and composite materials for use in the aerospace industry.

Fibre Reinforced Composites (FRCs) are increasingly used in large scale production the aerospace industry. Due to continued development, they are beginning to make a large impact within the automotive industry as well. Fibre Reinforced Composites (FRCs) are an attractive proposition due to the many advantages that they offer. They have a superior strength to weight ratio, a high resistance to fatigue and greater flexibility. This is leading to an increased use of these materials, from panels to structural reinforcements. Developments in the past twenty years have improved technologies both in the manufacture of these materials as well as machining techniques. This has resulted in a range of applications that has spread to the automotive and civil engineering industries, as well as to consumer markets. The aerospace industry is a market leader in the use of these modern materials and is currently responsible for the majority of the global consumption. Due to the nature of their use within these industries, there is a great emphasis on machining to a high dimensional precision as well as achieving a super-fine surface finish.

One such application is in the aircraft industry, which employs composites in a range of different applications, namely, from large panels and structural reinforcements to smaller internal components. FRCs are extremely difficult to machine due to the layered composition and the heterogeneity that is a common characteristic of these modern materials. Therefore the costs associated with the machining processes using conventional drill bits and traditional methods have become an important consideration when undertaking projects involving composites. The development of machining technologies and tooling is critical to the success of composites as the expenses that are associated with scrapping large components, such as aircraft panels, can be substantial.

Commonly machining operations can require multiple passes and multiple tools to acquire a desired dimensional accuracy and/or surface finish. As a result, the industry are constantly striving to develop new tooling with which to perform so called 'one pass' operations. A one pass operation is described as a machining operation that only requires one tool and one pass to achieve the desired results. Multiple passes can be described with reference to drilling as a roughing hole and a finishing hole, which respectively refers to an initial hole to be drilled without due consideration to finish, and a secondary drilling operation, with commonly a different tool, to re-drill the roughed hole to required specification. With a one pass operation the cost of machining is greatly reduced and the manufacturing capacity is vastly increased.

Traditional drill geometry, such as twist drills (see FIGS. 1a and 1b below) have proven to be ineffective in composite machining due to the high forces generated by the obtuse angle at the drill tip, which leads to heat generation. In FRCs and Carbon Fibre Composites (CFCs), this heating affects the cured state of the material matrix which can cause structural degradation. This also makes it difficult or impossible to ensure the dimensional accuracy. In addition to heating, the obtuse angle on a traditional drill can damage the material by causing premature burst out and de-lamination, due to the pushing and spreading of the material. This in turn results in stress raisers, shortened material life and, ultimately, material failure, Furthermore, the modern composites can be extremely abrasive. Therefore even hard materials such as tungsten carbide give poor results with respect to tool life and durability. Consequently diamond incorporated tooling is a now a popular choice for engineers despite the difficulties in manufacturing and costs, as the wear resistance characteristics help prolong tool life and maintain drill hole quality.

GB patent specification 2 436 723 A describes a drill bit with polycrystalline diamond inserts, the drill bit having a 'dagger' geometry. Dagger drill geometry (see FIGS. 1c and 1d below) has proven favourable in comparison to traditional twist drills as the acute angles allow for a hole to be drilled gradually which helps to prevent de-lamination. Two flute dagger blades are especially popular. The past decade has seen engineers combine diamond with dagger blades (see FIG. 1c) to help increase tool life and hole quality. The narrow angle of the cutting edge (typically 30°) aids location of the hole and improves drill stability, as the cutting forces are directed away from the direction of travel and into the part being drilled. This reduction in the axial forces into the material reduces the possibility of de-lamination effects and improves surface finish quality. The sharp point creates high cutting forces that tear through the fibres in FRC materials.

However, a problem remains in that the material supporting the dagger drill tip is greatly reduced and so the productivity rates are restricted to avoid tool failure, and the tool suffers from poor longevity. Also, the load on each cutting edge is notably high as it can only be distributed over two cutting edges, owing to the blade form of the drill. This limits further development of this type of tool.

It is an aim of the present invention to alleviate the aforementioned problems and allow productivity to be improved whilst simultaneously increasing tool life while achieving cost reductions. It is a further aim of the present invention to improve the quality of the drilled hole in terms of dimensional accuracy and surface finish quality.

According to the present invention, there is provided a drill reamer comprising an elongate body disposed about a longitudinal axis, the elongate body comprising a plurality of separate hard cutting sections and a soft cutting section, wherein the soft cutting section is formed of a material having a hardness that is less than the hard cutting sections and at least one first hard cutting section is axially displaced relative to at least one second hard cutting section.

In a preferred embodiment, a tip is provided at a leading end of the drill reamer. In this case, the tip has a drill tip cutting edge that defines a drilling angle and the reamer has a plurality of flutes each having a tapered cutting edge portion disposed at an acute angle relative to the longitudinal axis. The tapered cutting edge portions are operative for drilling a tapered hole during a machining process. The drilling angle relative to the longitudinal axis is greater than the acute angle. The acute angle may be between 11° and 23°. The first hard cutting section is advantageously disposed at the tip and defines the tip cutting edge and defines part of the tapered cutting edge portion of at least one of the flutes.

In one embodiment, the at least one of the flutes comprises the second hard cutting section axially spaced apart from the first hard cutting section, defining another part of the tapered cutting edge portion of the at least one of the flutes. This embodiment may have two pairs of flutes each having one of the second hard cutting sections axially spaced apart from the first hard cutting section. These flutes may be disposed at substantially 90° with reference to one another, or staggered slightly to reduce harmonics.

In an alternative embodiment, the second hard cutting sections are disposed on alternate flutes and define a part of the tapered cutting edge portion of a different flute from the at least one of the flutes. In a modified version of this embodiment the first hard cutting section overlaps the second hard cutting section in an axial direction.

Drill reamers embodying the present invention may be provided with the plurality of flutes each having a reaming edge disposed parallel to the longitudinal axis. In this case, the second hard cutting section may also comprise part of the reaming edge. The plurality of hard cutting sections may be in the form of inserts attached, fused or brazed onto or into said elongate body, and the elongate body of the drill reamer may be formed of the material of the soft cutting section. This material may be carbide or tungsten carbide. The material of the hard cutting section is preferably diamond or polycrystalline diamond. The drill reamer may be provided with coolant holes in the elongate body and/or at the tip, for releasing coolant onto the drill reamer and machined part.

Embodiments of the present invention advantageously provide a combination of cutting edges together with a combination of cutting edge materials that optimises cutting efficiency and precision on the one hand with improved longevity on the other. The result is a reduction in the cost of machining due to; decreased machine downtime due to less tool changes, increased production resulting in increased capacity and the cost of the drill spread across more holes reducing the cost of tooling.

Embodiments are provided with a drill tip having an obtuse point angle of $\alpha°$ and a hard cutting edge to establish an initial penetration into the composite material being drilled. This initial penetration uses high thrust forces to drill through the part, which accentuates common complications whilst drilling FRCs, such as premature burst out, delamination and burring. To overcome this, the cutting edge switches from the obtuse angled drill tip to the tapered cutting edge of the drill reamer as the hole progresses. The acute angle $\beta°/2$ of the tapered cutting edge relative to the longitudinal axis of the drill reamer is such as to remove damaged material caused by initial drilling and slowly drill a tapered hole. This prevents further delamination to occur as the amount of material removed is small, and the respective forces generated by this cutting action are low.

The portion of the hard cutting section of the tip that extends along an initial part of tapered cutting edge helps to initiate the cutting action as the drill enlarges the drilled hole. To aid stability and reduce vibration of the drill reamer at this stage, this initial drilling cut is followed by drilling with a soft cutting edge portion. This portion is disposed further along the tapered cutting edge and is actively cutting as the drill continues to penetrate the material. In one embodiment, a second hard cutting section is provided yet further along the tapered cutting edge away from the tip (so that the tip and second hard cutting sections are spaced apart by the soft cutting edge portion) to provide a precision cut as the drill reamer approaches a reaming cutting edge (which extends parallel to the longitudinal axis). This configuration may be provided on each flute although in an alternative embodiment, the second hard cutting section that is provided yet further along the tapered cutting edge may be provided on alternate flutes that are not provided with a hard tip cutting edge. A final reamed hole diameter is established as the tapered cutting edge terminates at commencement of a reaming edge that is parallel to the axis of the reamer. The second hard cutting section may extend for a predetermined extent either side of commencement of the reaming edge, Embodiments may allow a greater degree of drilling precision between holes, possibly a tolerance between holes not exceeding 3 microns.

As described, the drill reamer drills an initial rough hole, smaller in diameter than the finished hole specification and causing delamination and burring. The drill reamer then performs a secondary drilling operation using the tapered cutting section of the tool to remove fully or partly the damage caused by initial drilling and a final reaming operation to finish the hole to conform within a specified tolerance and obtain a desired surface finish. Therefore the tool described can be used as a one pass hole and removes the requirement for a roughing pass, a finishing pass and a final reaming pass to create the hole. Not only does this encompass significant savings on multiple tools, this extends tool longevity and also greatly improves production rates by reducing the amount of tool changes and machine down time. This will also result in cost savings on tooling, as one tool is used to perform the job of two or three.

The invention will now be further described by way of example with reference to the accompanying drawings in which like reference numeral designate like elements:

FIG. 1b illustrates a cutting direction D and a thrust direction F of the drill of FIG. 1a;

Figure 1A:
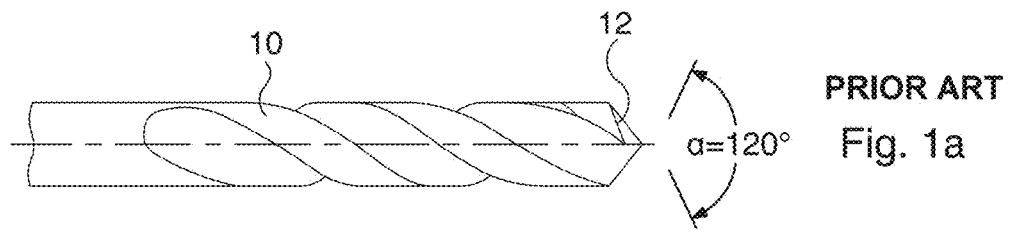
FIG. 1a illustrates a conventional twist drill.
Figure 1B:
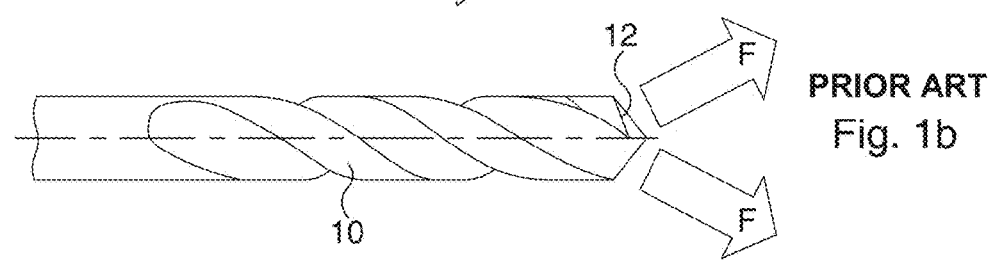
Figure 1C:
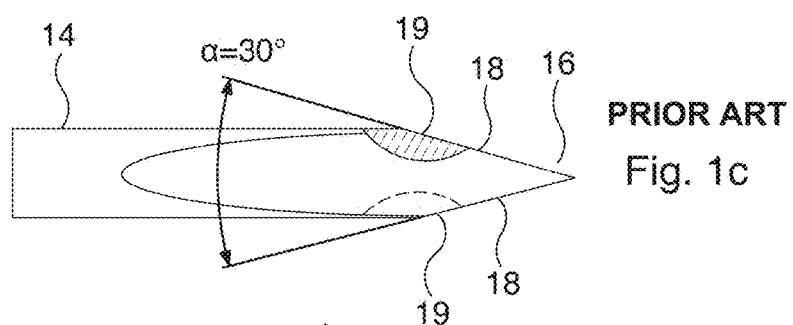
FIG. 1c illustrates a conventional dagger drill.

FIG. 1a shows a conventional twist drill 10 having a drilling tip point angle 12 of $\alpha°=120°$ and FIG. 1b shows a drilling direction D and direction F of thrust generated by the tip 12. FIG. 1c illustrates a dagger drill 14 having a drilling point/cutting edge angle 16 of $\alpha°=30°$. The drill 14 has a pair of cutting edges 18 disposed at this acute angle relative to the longitudinal axis of the drill, the cutting edges 18 being provided with respective diamond inserts 19 (one being shown in hidden detail in FIG. 1c). The drill 14 exerts a cutting force dispersion F away from cutting direction, into the part as illustrated.

As noted above, the twist drill 10 is ineffective in composite machining due to high forces generated due to the obtuse tip point angle 12. As the forces are in the same direction as the drilling direction, the drill pushes through the material and can cause premature burst out and delamination on exit of hole. The high forces generated also results in heating which affects the cured state of the matrix in FRC materials. This can lead to structural degradation and alteration of the FRC properties thereby deterioration of the final part quality, or final part ruin. This also compromises dimensional accuracy.

Figure 1D:
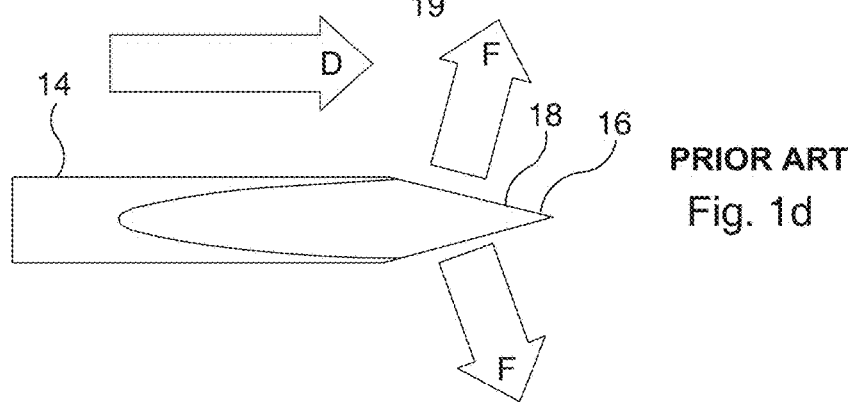
FIG. 1d illustrates a cutting direction D and a thrust direction F of the drill of FIG. 1d.

The dagger drill 14 represents an improvement over the conventional twist drill 10 as the acute angle $\alpha$ of the cutting edges 18 allows for a hole to be drilled gradually which helps to prevent de-lamination. The two flute dagger drill of FIGS. 1c and 1d is provided with diamond inserts to help increase tool life and hole quality. However this type of drill exerts very high cutting forces into the part, which causes rapid edge quality deterioration on the drill increasing the rate of tool failure. This compromises productivity and increases the cost per hole. Furthermore, the load on each of the cutting edges 18 is notably high as it can only be distributed over the two cutting edges 18, which limits further development of this type of drill.

Figure 2A:
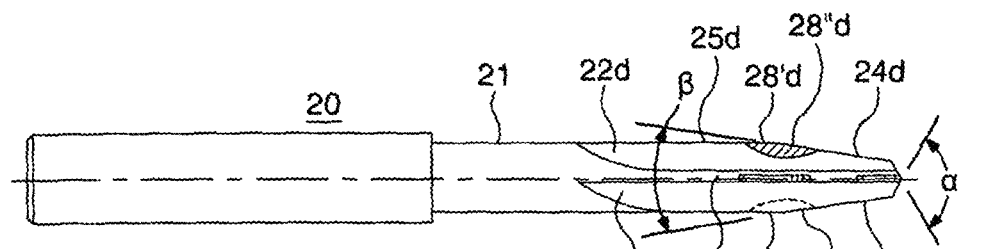
FIG. 2a is a side elevation of a drill reamer according to a first embodiment of the present invention.
Figure 2B:
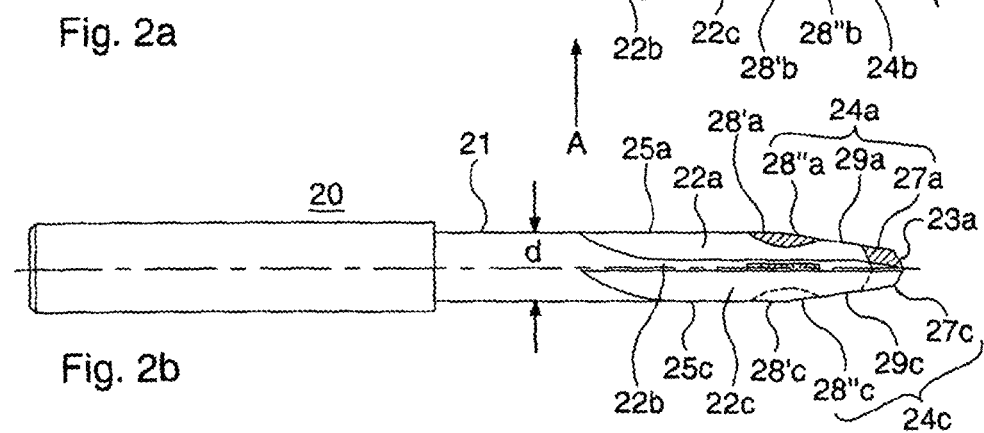
FIG. 2b is a view of the drill of FIG. 2a rotates through 90° about its longitudinal axis.
Figure 2C:
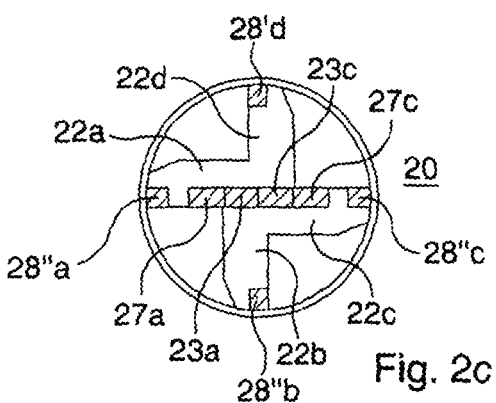
FIG. 2c is an end-on view of the drill reamer of FIGS. 2a and 2b.
Figure 2D:
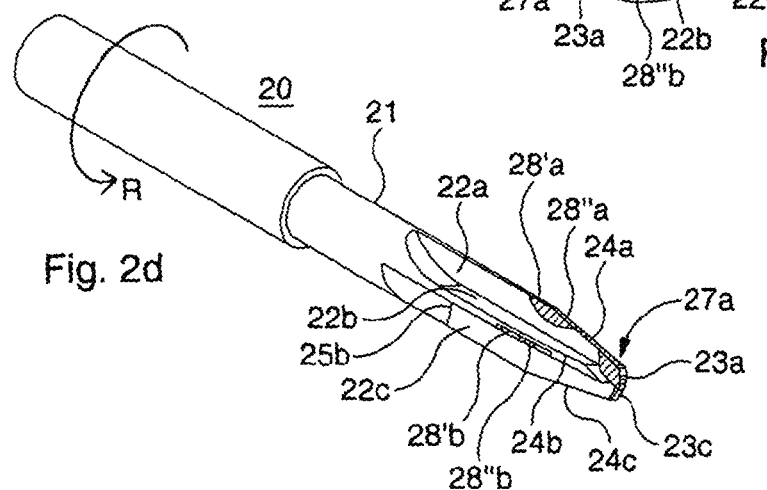
FIG. 2d is an isometric view of the drill reamer of FIGS. 2a to 2c.

FIG. 2a is side elevation view of a drill reamer 20 embodying the present invention and FIG. 2b is another side elevation view in the direction of arrow 'A' of the drill reamer 20. FIG. 2c is an 'end-on' view and FIG. 2d is an isometric view. The drill reamer has a cylindrical body 21 of a high hardness sintered material, such as tungsten carbide, and has four flutes 22a to 22d disposed at approximately 90° with respect to one another. The drill reamer 20 is intended for, but not limited to, the drilling of any non-ferrous materials, such as Carbon Fibre Composite (CFC). The geometry of the drill reamer is twofold. The drill reamer 20 has a tip defined by cutting edges 23a and 23c which are provided at the leading end of corresponding ones of the flutes 22a and 22c. The tip has standard drill point geometry, with an angle α (see FIG. 2a). The tip cutting edges 23a and 23c are formed from or provided with diamond or polycrystalline diamond inserts on respective flutes 22a and 22c. The polycrystalline diamond tip on the flute 22a is opposite facing relative to the polycrystalline diamond tip on the flute 22c so that the cutting edges 23a and 23c of the tip are defined by the polycrystalline diamond inserts as the drill reamer rotates in the direction of arrow shown in FIG. 2d.

Each flute 22a to 22d has a tapered cutting edge portion 24a to 24d disposed at an angle β/2 relative to the longitudinal axis of the drill reamer 20. The tapered cutting edge portions 24a to 24d extend between the tip of the drill and reaming edges 25a to 25d provided on respective flutes 22a to 22d. The tapered cutting edge portions are operative to drill a tapered hole during a machining process, the hole having a finished diameter of 'd' when the reaming edges 25a to 25d enter the hole (not shown). The polycrystalline diamond inserts of the cutting edges 23a and 23c define leading parts 27a and 27c of the tapered cutting edge portions 24a and 24c that are provided on respective flutes 22a and 22c. These leading parts 27a and 27c establish an initial drill cut as the drilling action is performed by the tapered cutting edge portions 24a and 24c. This embodiment adopts a 'combination cutting edge' concept in which the drilling is performed by a combination of cutting edges that are formed from hard and relatively soft materials.

For example, in this embodiment, the tapered cutting edge portions 24a and 24c of the flutes 22a and 22c have the leading parts 27a and 27c formed from polycrystalline diamond inserts and the corresponding portions of the tapered cutting edge portions 24b and 24d of the flutes 22b and 22d are formed from the relatively soft carbide material. Consequently, in the cutting direction of the arrow 'R', the initial cut of the tapered cutting edge portions 24a to 24d is performed by alternate hard and soft cutting edges. The flutes 22a to 22d of the drill reamer 20 are each further provided with a second hard cutting section 28'a, 28"a to 28'd, 28"d respectively. Each of the second hard cutting sections is formed of a harder material, such as a polycrystalline diamond, than the material of the cylindrical body 21 and has one cutting edge 28'a to 28'd which forms part of the corresponding reaming edge 25a to 25d, and another cutting edge 28"a to 28"d that forms a part of the corresponding tapered cutting edge 24a to 24d. The cutting edges 28"a and 28"c are separated from the leading drill tip 27a and 27c respectively so that the tapered cutting edges 24a and 24c each have a cutting section 29a and 29c of relatively soft material, which may be of the same material as the cylindrical body 21, disposed substantially along their mid-region (see FIG. 2b). This provides a further 'combination cutting edge' structure which utilizes a hard cutting section as the drill reamer 20 transitions its cut from a tapered hole to a cylindrical one that corresponds to the reaming edge diameter 'd'.

The polycrystalline diamond inserts can be secured on to the drill reamer 20 by fusing or brazing the inserts into a machined slot or pocket.

The 'combination cutting edge' adopted in the embodiment of FIGS. 2a to 2d is advantageous in that the ability of the drill reamer to ream holes in abrasive materials, such as CFCs while achieving a tool life of over 1200 holes without undue burring/de-lamination is enhanced. This reduces the cost of manufacturing as the cost of the drill is spread over more holes. Embodiments of the present invention utilize the high axial forces created by a drill tip with traditional geometry (obtuse angle) to initially break through the material. Due to the diamond insert, the tool wear is greatly reduced, resulting in a much higher tool life. The elongate, tapered cutting edge then removes the regions of material that has been damaged by the high forces generated by the drilling operation and drills a clean hole.

As noted above, the cutting sections 29a and 29c of the tapered cutting edges 24a and 24c are made from exposed body, typically carbide. This is advantageous as the carbide wears quicker than the diamond and stabilises the drill reamer in the hole, preventing vibration.

The hard cutting sections 28'a, 28"a to 28'd, 28"d ensure a sharp cutting edge is retained for longer than common drill materials such as tungsten carbide or high speed steel. When this section of the cutting edge is engaged, there is little material left to remove. Therefore these diamond inserts require lower cutting forces to finish the hole resulting in a clean surface finish. This embodiment utilizes four flutes 22a to 22d thereby reducing the load per cutting edge. This improves tool life and reduces vibration. It also reduces chip size and helps with swarf evacuation from cutting surfaces due to evacuation channels, or flutes, created when using coolant. By incorporating four flutes, the tool is stabilised and therefore the highest feed rate at which the drill can perform is increased.

In addition, the high wear resistance characteristics of diamond ensure the sharp cutting edges remain sharp, allowing for a clean cut and reamed surface on the interior of the hole. As the cutting edges retain a clean sharp edge any vibration is scarce and surface finish quality is retained. Extensive structural testing in a variety of materials has shown that the structural integrity is not compromised in or around the hole for the entire tool life. Some embodiments of the present invention may provide for drilling of three times the number of holes than achievable through use of the dagger drill of FIGS. 1c and d. Some embodiments may achieve an increase in speeds and feeds of around 40% relative to the conventional dagger drill. This increases productivity, decreases machine downtime a result of multiple tool changes and therefore reduces the cost per hole.

Although embodiments are described as having 4 flutes, the number of flutes may be varied to include, for example, two, three or more than 4. Embodiments may preferably have a flute length of between 5 to 70% of the overall length of the cylindrical body. For example, the drill reamer may have a diameter in the range of 2 mm to 50 mm and a length in the range of 20 mm to 330 mm. Each flute preferably contains at least one section of diamond, but in the case of the 4 flute drill reamer at least two of the flutes must contain two portions of diamond as illustrated in FIGS. 2a to 2d. In this case, the drill tip provides at two cutting surfaces. Embodiments may be provided with channels through which coolant may be applied through the body of the tool, either exiting at the tip of the tool or on one or more of the flutes.

Figure 3A:
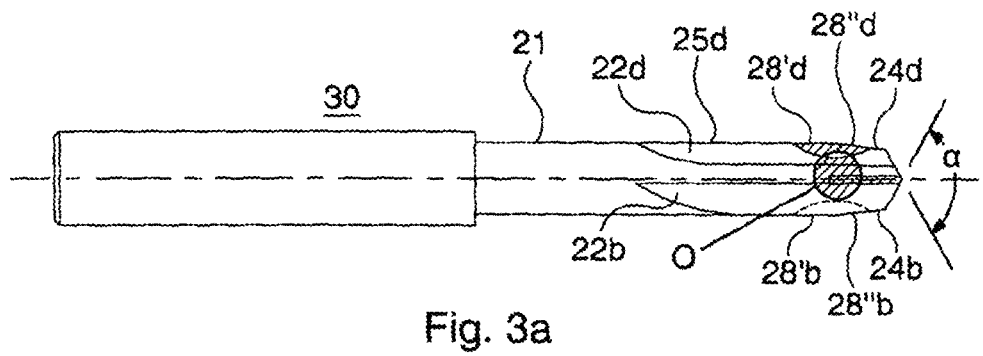
FIGS. 3a to 3c show views of a drill reamer according to a second embodiment.
Figure 3B:
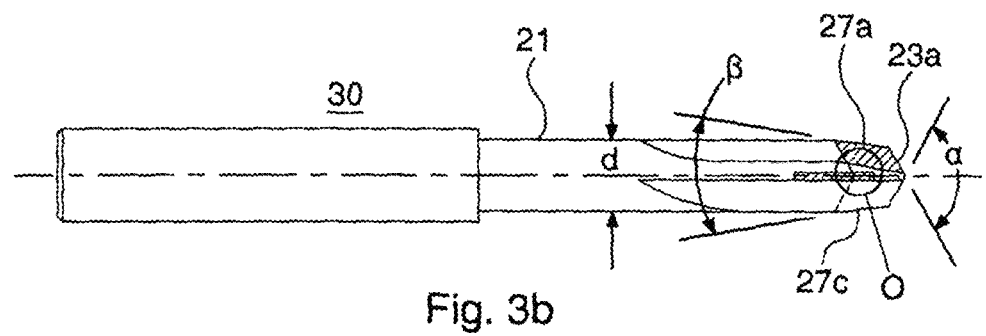
Figure 3C:
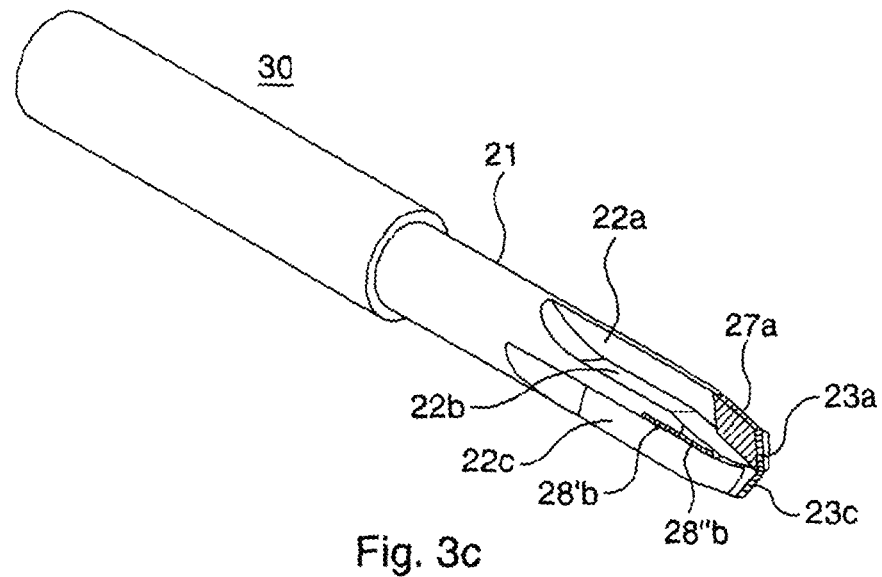

Other variants to the embodiment described with reference to FIGS. 2a to 2d are envisaged. For example, FIGS. 3a-3c and 4a-4c show drill reamers which are similar to the drill reamer of FIGS. 2a to 2d but have different arrangements of combination cutting edges. FIGS. 3a-3c and FIGS. 4a-4c correspond to the views presented in FIGS. 2a, 2b and 2d respectively, FIGS. 3a-3c show a drill reamer 30 having the four flutes 22a to 22d but as seen from FIG. 3c, the flutes 22a and its opposite flute 22c, are not provided with second hard cutting sections that correspond to sections 28'a, 28"a and 28'c, 28"c of FIG. 2b. In addition, the axial lengths of the tapered cutting sections 24a to 24d are shorter than the corresponding tapered cutting sections of FIGS. 2a to 2d. Consequently, as shown in FIG. 3a, the second hard cutting sections 28'b, 28"b and 28d, 28"d overlap in region 'O' in an axial direction with the leading parts 27a and 27c.

Figure 4A:
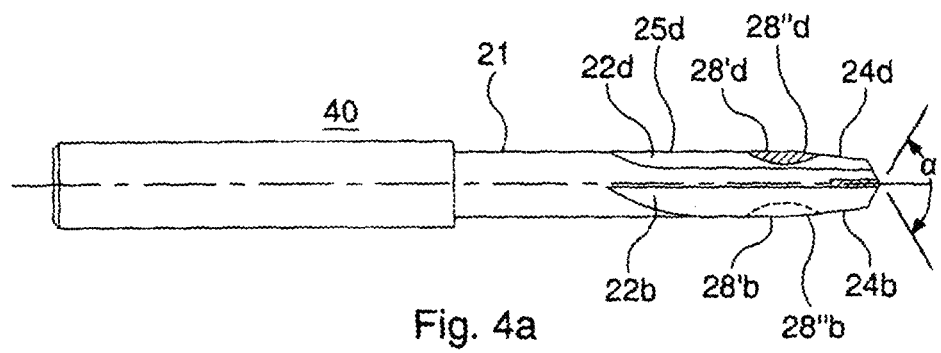
FIGS. 4a to 4c show views of a drill reamer according to a third embodiment.
Figure 4B:
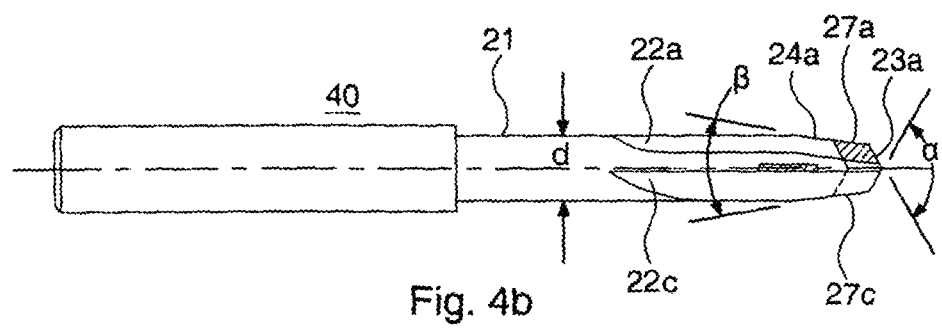
Figure 4C:
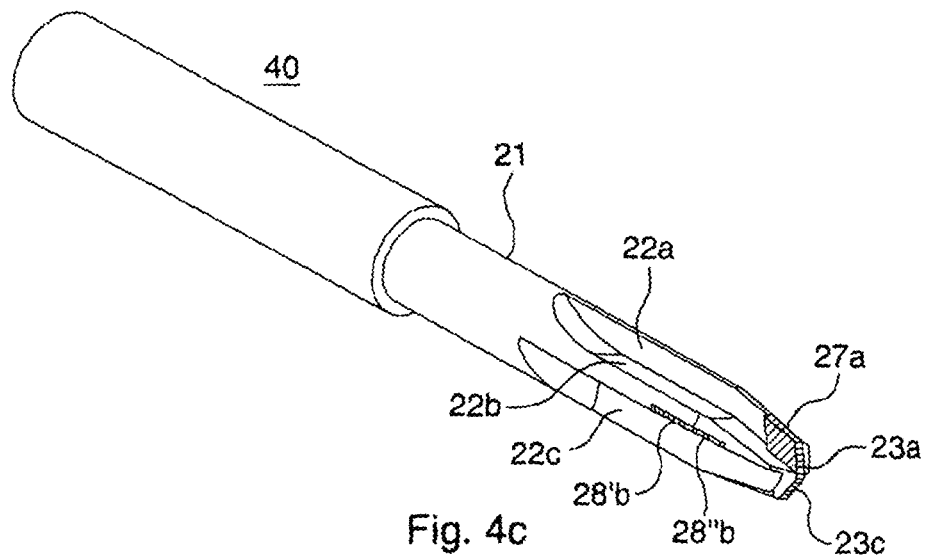

FIGS. 4a-4c show a drill reamer 40 also having the four flutes 22a to 22d but as seen from FIG. 4c, the flutes 22a and its opposite flute 22c, are also not provided with second hard cutting sections that correspond to the sections 28'a, 28"a and 28'c, 28"c of FIG. 2b. In contrast to the embodiment shown in FIGS. 3a-3c, the axial lengths of the tapered cutting sections 24a to 24d are longer than the corresponding tapered cutting sections of FIGS. 3a to 3c. Consequently, as shown in FIG. 4a, the second hard cutting sections 28'b, 28"b and 28'd, 28"d are axially displaced in an axial direction relative to the leading parts 27a and 27c.

The invention claimed is:

1. A drill reamer, comprising: an elongate body disposed about a longitudinal axis, the elongate body comprising a plurality of separate hard cutting sections and a soft cutting section, wherein said soft cutting section is formed of a material having a hardness that is less than said hard cutting sections and at least one first hard cutting section is axially displaced relative to at least one second hard cutting section; and a tip at a leading end of the drill reamer, the tip having a tip cutting edge that defines a drilling angle: and a plurality of flutes each having a tapered cutting edge portion disposed at an acute angle relative to the longitudinal axis, the tapered cutting edge portions being operative for drilling a tapered hole during a machining process: wherein the drilling angle relative to the longitudinal axis is greater than said acute angle, wherein said first hard cutting section is disposed at the tip and defines all of said tip cutting edge and defines part of said tapered cutting edge portion of at least one of said flutes.

2. A drill reamer according to claim 1, wherein said at least one of said flutes comprises said second hard cutting section axially spaced apart from said first hard cutting section, defining another part of said tapered cutting edge portion of said at least one of said flutes.

3. A drill reamer according to claim 2, comprising two pairs of flutes each having said second hard cutting section axially spaced apart from said first hard cutting section.

4. A drill reamer according to claim 2, wherein said first hard cutting section of said at least one flute overlaps the second hard cutting section of an opposite flute in an axial direction.

5. A drill reamer according to claim 1, wherein said second hard cutting section is disposed on alternate flutes and defines a part of said tapered cutting edge portion of a different flute from said at least one of said flutes.

6. A drill reamer according to claim 1, wherein the plurality of flutes each have a reaming edge disposed parallel to the longitudinal axis.

7. A drill reamer according to claim 6, wherein said second hard cutting section also comprises part of said reaming edge.

8. A drill reamer according to claim 1, wherein the acute angle is between 11° and 23°.

9. A drill reamer according to claim 1, wherein said plurality of hard cutting sections are inserts attached, fused or brazed onto or into said elongate body, and the elongate body of the drill reamer is formed of the material of the soft cutting section.

10. A drill reamer according to claim 1, wherein the material of the soft cutting section is carbide or tungsten carbide.

11. A drill reamer according to claim 1, wherein the material of the hard cutting section is diamond or polycrystalline diamond.

* * * * *